United States Patent
Levenberg et al.

(10) Patent No.: US 6,811,491 B1
(45) Date of Patent: Nov. 2, 2004

(54) INTERACTIVE VIDEO GAME CONTROLLER ADAPTER

(76) Inventors: Gary Levenberg, 270 Valley St., San Francisco, CA (US) 94131; Brian Clemens, 1340 McAllister St, San Francisco, CA (US) 94131; Dan Klitsner, 441 Holcomb St., Larkspur, CA (US) 94131

(*) Notice: Subject to any disclaimer, the term of this patent is extended or adjusted under 35 U.S.C. 154(b) by 481 days.

(21) Appl. No.: 09/686,275

(22) Filed: Oct. 10, 2000

Related U.S. Application Data

(60) Provisional application No. 60/158,288, filed on Oct. 8, 1999.

(51) Int. Cl.[7] ............................ A63F 13/00; A63F 9/24; G06F 17/00; G06F 19/00; A63B 71/00
(52) U.S. Cl. .............................. 463/47; 463/46; 463/7; 463/37; 463/38; 273/148 R; 273/148 B
(58) Field of Search .............................. 463/47, 46, 37, 463/38, 1, 2, 6–8; 273/148 R, 309, 440.1, 440, 148 B

(56) References Cited

U.S. PATENT DOCUMENTS

| | | | | |
|---|---|---|---|---|
| 4,540,176 A | * | 9/1985 | Baer | 463/37 |
| 4,568,080 A | * | 2/1986 | Yokoi | 463/34 |
| 4,575,591 A | * | 3/1986 | Lugaresi | 200/6 A |
| 4,786,768 A | * | 11/1988 | Langewis et al. | 200/6 A |
| D320,018 S | * | 9/1991 | Bakanowsky, III | D14/172 |
| 5,091,832 A | * | 2/1992 | Tortola et al. | 362/109 |
| 5,213,327 A | * | 5/1993 | Kitaue | 463/38 |
| 5,213,335 A | * | 5/1993 | Dote et al. | 463/51 |
| D336,665 S | * | 6/1993 | Tugendhaft | D21/329 |
| 5,312,114 A | * | 5/1994 | Lipson | 434/236 |
| 5,464,214 A | * | 11/1995 | Griffin | 273/148 B |
| D370,501 S | * | 6/1996 | Raviv et al. | D14/401 |
| D377,057 S | * | 12/1996 | Lee | D14/401 |
| 5,615,083 A | * | 3/1997 | Burnett | 361/686 |
| 5,685,776 A | * | 11/1997 | Stambolic et al. | 463/46 |
| 5,766,077 A | * | 6/1998 | Hongo | 463/30 |
| D397,729 S | * | 9/1998 | Schulz et al. | D21/324 |
| D399,268 S | * | 10/1998 | Liu | D21/333 |
| D401,629 S | * | 11/1998 | Wing | D21/329 |
| 5,855,483 A | * | 1/1999 | Collins et al. | 434/322 |
| 5,883,690 A | * | 3/1999 | Meyers et al. | 345/161 |
| 5,967,898 A | * | 10/1999 | Takasaka et al. | 463/37 |
| 5,976,018 A | * | 11/1999 | Druckman | 463/47 |
| 6,083,104 A | * | 7/2000 | Choi | 463/6 |
| 6,086,478 A | * | 7/2000 | Klitsner et al. | 463/35 |
| 6,159,101 A | * | 12/2000 | Simpson | 463/46 |
| 6,193,609 B1 | * | 2/2001 | D'Achard Van Enschut | 463/37 |
| 6,200,219 B1 | * | 3/2001 | Rudell et al. | 463/37 |
| 6,209,845 B1 | * | 4/2001 | Klitsner et al. | 248/694 |
| 6,210,278 B1 | * | 4/2001 | Klitsner | 463/35 |
| 6,290,565 B1 | * | 9/2001 | Galyean, III et al. | 446/99 |
| 6,322,449 B1 | * | 11/2001 | Klitsner et al. | 463/37 |

* cited by examiner

*Primary Examiner*—A. L. Wellington
*Assistant Examiner*—Binh-An D. Nguyen

(57) ABSTRACT

A video game system includes an output screen, a video game controller, video game software, and an interactive video game controller adapter. The video game controller has control buttons for inputting commands to manipulate images output to the screen. The video game software interfaces between the video game controller and the screen. The interactive video game controller adapter is attached to the video game controller and is shaped to represent the unique characteristics of a particular video game. The adapter has input controls shaped to simulate the real-life activity emulated by the video game. The appropriate control buttons of the video game controller are activated when the corresponding input controls of the adapter are activated.

18 Claims, 12 Drawing Sheets

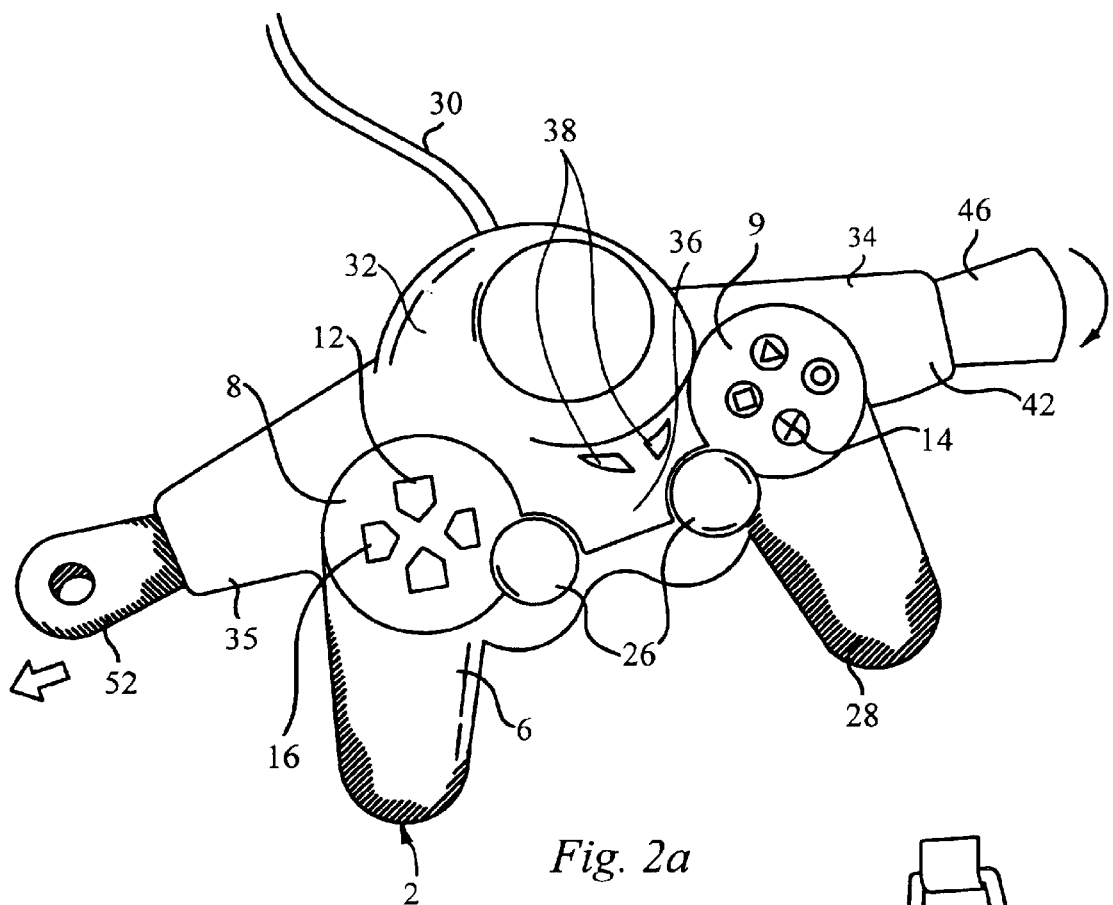
*Fig. 2a*
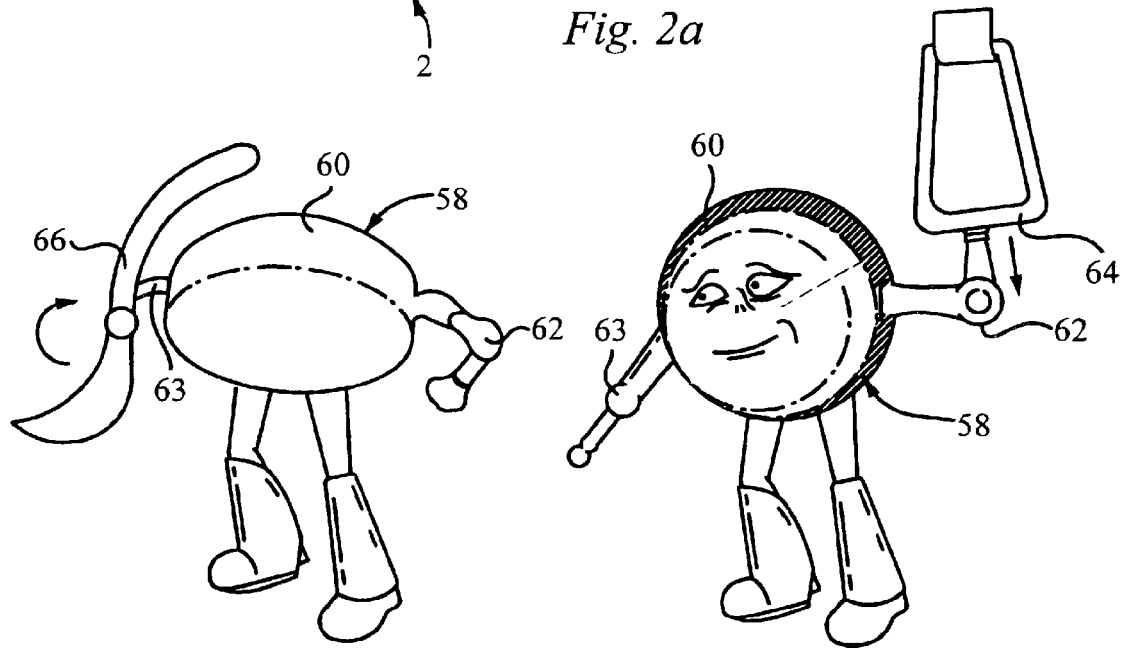
*Fig. 2b*       *Fig. 2c*

INTERACTIVE VIDEO GAME CONTROLLER ADAPTER

RELATED APPLICATIONS

This application claims priority under 35 U.S.C. § 119(e) of the co-pending U.S. provisional application Ser. No. 60/158,288 filed on Oct. 8, 1999 and entitled "Playtop Toys."

FIELD OF THE INVENTION

The present invention relates to an interactive video game controller adapter. More particularly, the present invention relates to an interactive video game controller adapter designed to be attached to a video game controller whereby manipulation of input controls of the adapter simulates onscreen activity of a video game and activates corresponding control buttons of the controller.

BACKGROUND OF THE INVENTION

Video game systems have become an increasingly popular form of home entertainment. A hand held controller is a commonly used video game system input device. Most controllers include a directional control such as a D-pad (four button directional pad) or a joystick, along with several control buttons for controlling onscreen activity of the video game. Conventional controllers vary in design but can be used with a wide variety of video games. Some controllers have been specifically designed for a certain type of video game. For example, steering wheel controllers are available for car racing video games. Products for enhancing existing controllers are available which provide better grip or convert a D-pad to a joystick.

The large selection of different video games available for any given video game system is typically controlled by the same controller. Utilizing the same directional control and control buttons to manipulate onscreen activity for different video games does not enhance video game interactivity. For example, a pistol shooting video game requires a user to depress a button on the controller to fire the pistol rather than having the user actually squeeze a trigger of a pistol mounted on the controller. A controller having unique physical characteristics resembling the onscreen activity of the corresponding video game would enhance video game interactivity. However, consumers may be reluctant to purchase a different controller for each video game due to cost and storage requirements. Hence, a mechanism for adapting a single video game controller to simulate the real-life activity depicted by the corresponding video game is desired.

SUMMARY OF THE INVENTION

A video game system in accordance with one aspect of the present invention includes an output screen, a video game controller, video game software, and an interactive video game controller adapter. The video game controller has control buttons for inputting commands to manipulate images output to the screen. The video game software interfaces between the video game controller and the screen. The interactive video game controller adapter is attached to the video game controller and is shaped to represent the unique characteristics of a particular video game. The adapter has input controls shaped to simulate the real-life activity emulated by the video game. The appropriate control buttons of the video game controller are activated when the corresponding input controls of the adapter are activated.

A video game input device in accordance with another aspect of the present invention includes a video game controller and an interactive video game controller adapter. The video game controller has control buttons for inputting commands to manipulate images output to a screen. The interactive video game controller adapter is attached to the video game controller and is shaped to represent the unique characteristics of a particular video game. The adapter has input controls shaped to simulate the real-life activity emulated by the video game. The appropriate control buttons of the video game controller are activated when the corresponding input controls of the adapter are activated.

An interactive video game controller adapter in accordance with another aspect of the invention attaches to a video game controller. The interactive video game controller adapter is shaped to represent the unique characteristics of a particular video game. The adapter has input controls shaped to simulate the real-life activity emulated by the video game. Control buttons of the video game controller are activated when the corresponding input controls of the adapter are activated.

BRIEF DESCRIPTION OF THE DRAWINGS

FIG. 1b is an alternate view of FIG. 1a.

FIG. 2a illustrates an assembled view of FIG. 1a.

FIG. 2b illustrates an onscreen image manipulated by the interactive video game controller adapter of the present invention.

FIG. 2c is an alternate view of FIG. 2b.

DETAILED DESCRIPTION OF THE PREFERRED EMBODIMENTS

Figure 1A:
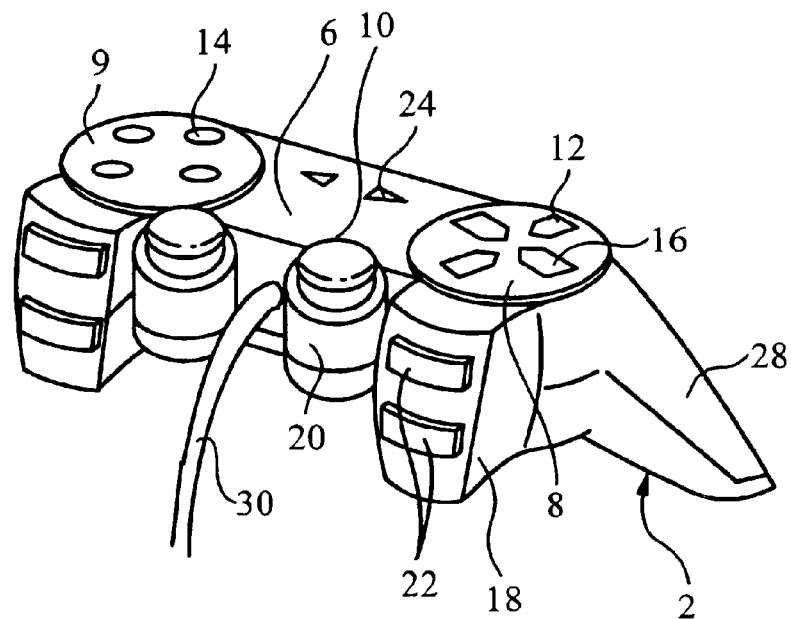
FIG. 1a illustrates a perspective view of a video game controller and an interactive video game controller adapter in accordance with a first embodiment of the present invention.
Figure 1A:
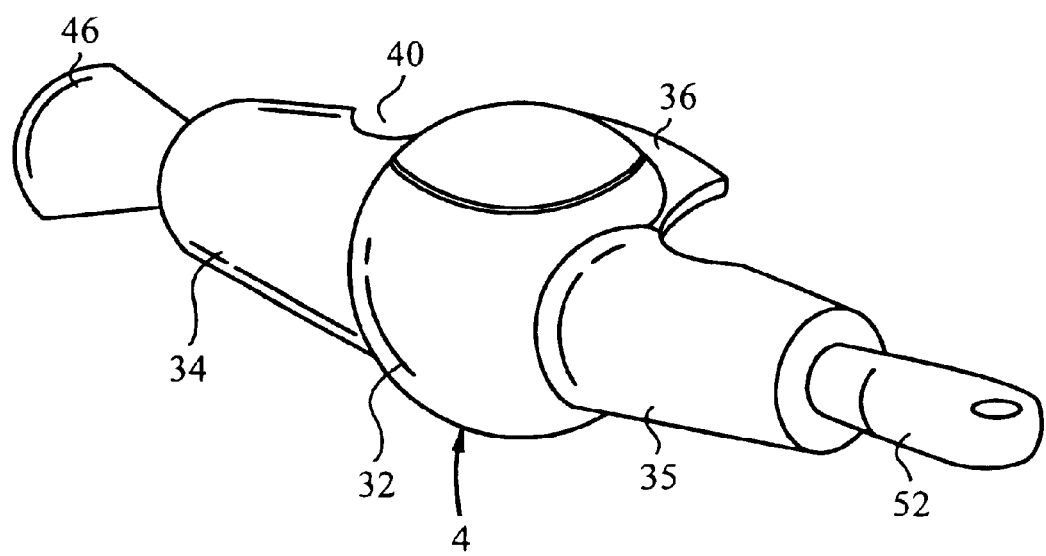
Figure 1B:
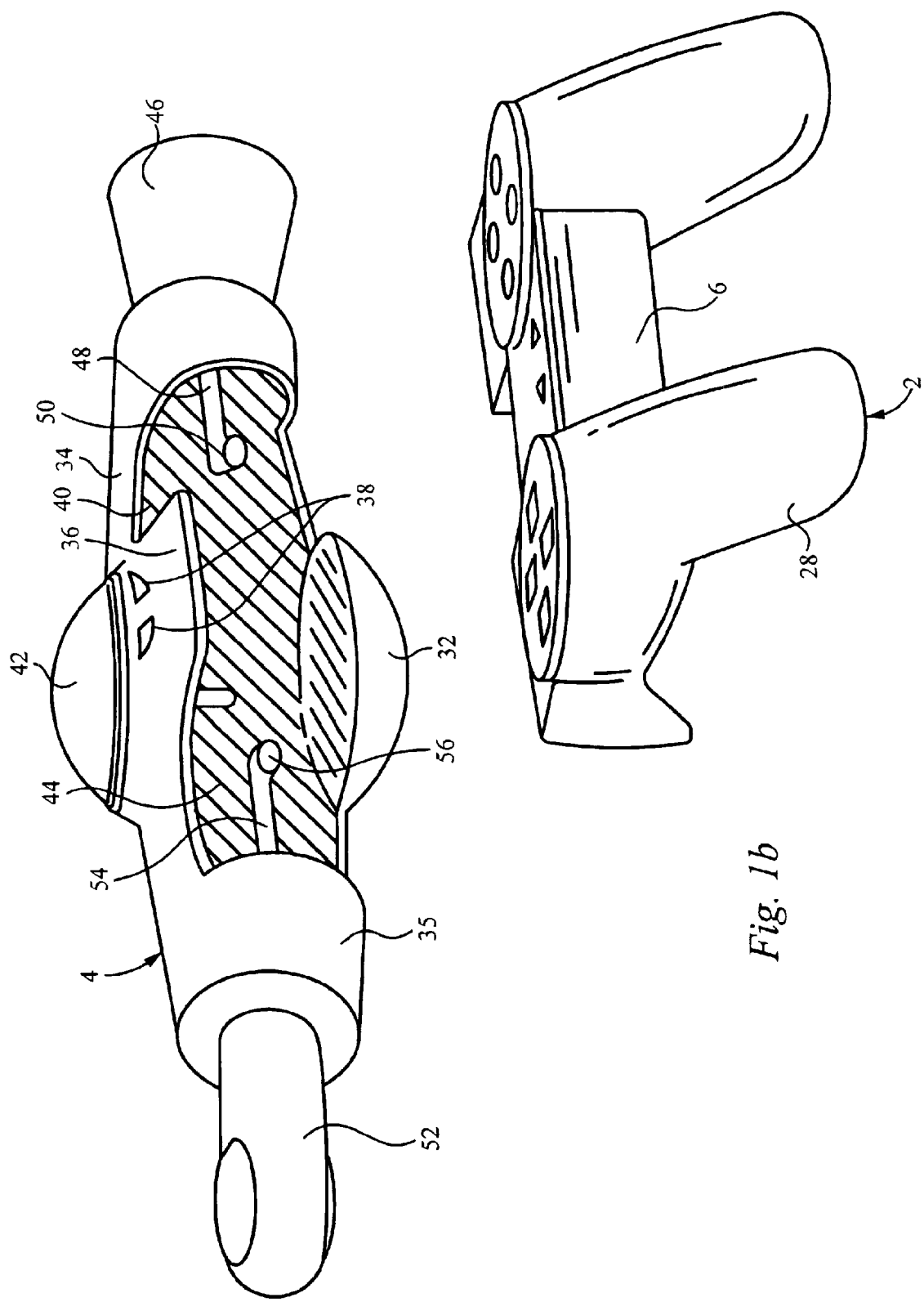

Referring to FIGS. 1a and 1b, video game system of the present invention includes an output screen (not shown), video game software (not shown), a video game controller 2 and an interactive video game controller adapter 4. The controller 2 and the adapter 4 in accordance with a first embodiment of the present invention are shown. The controller 2 shown is used with a Sony Playstation™ video game system but those of ordinary skill in the art understand that the adapter 4 of the present invention can be modified to accommodate other video game controllers such as those used with Sega or Nintendo video game systems. The controller 2 comprises a main body 6, first and second circular base plates 8, 9 spaced from each other a predetermined distance on a top face 10 of the main body 6, a D-pad directional control 12 positioned on the first base plate 8, and four first control buttons 14 positioned on the second base plate 9. The directional control 12 includes four second control buttons16. Two projections 18 are formed on a rear face 20 of the main body 6. Two third control buttons 22 are positioned on a rear face of each projection 18. A pair of fourth control buttons 24 project from the top face 10 of the main body 6 between the base plates 8, 9. A pair of push buttons 26 extend from the top face 10 of the main body 6 proximate the fourth control buttons 24 and a front face of the main body 6. A pair of handgrips 28 projects from opposite ends of the main body 6. A power cord 30 extends from the rear face 22 of the main body 6 and electrically connects the controller 2 to the remainder of the video game system.

The adapter 4 of the first embodiment comprises a main body 32 having first and second arms 34, 35 extending from opposite sides of the main body 32. A lip 36 projects from a front portion 42 of the main body 32 between the first and second arms 34, 35. Two control pads 38 are formed on the lip 36. An arcuate cutout 40 is defined in each arm 34, 35 corresponding to the related base plate 8, 9 of the controller 2. A receiving space 44 is formed within the main body 32 and is exposed to the front potion 42. A rotatable knob 46 outwardly extends from the first arm 34. A first rod 48 inwardly extends from the knob 46 into the receiving space 44. A first end portion 50 perpendicularly extends from the first rod 48. A retractable handle 52 outwardly extends from the second arm 35. A second rod 54 inwardly extends from the handle 52 into the receiving space 44. A second end portion 56 perpendicularly extends from the second rod 54.

Referring to FIG. 2a, the adapter 4 is attached to the controller 2 by positioning the lip 36 of the adapter 4 between the base plates 8, 9 of the controller 2. The base plates 8, 9 and the projections 18 of the controller 2 are received in the receiving space 44 of the adapter 4. The control pads 38 of the adapter 4 are aligned with the fourth control buttons 24 of the controller 2. Thus, when a user depresses the control pads 38 of the adapter 4 the fourth control buttons 24 of the controller 2 are activated and an input signal is sent to the video game software. The end portions 50, 56 of the rods 48, 54 of the adapter 4 are positioned proximate the corresponding third control buttons 22 of the controller 2. Manipulation of the knob 46 and handle 52 causes the end portions 50, 56 of the rods 48, 54 to activate the corresponding third control buttons 22 of the controller 2 whereby more input signals are sent to the video software causing an onscreen image to move accordingly.

The video game software is designed to interface between the controller 2 with the attached adapter 4 and the video game system in order to facilitate a unique physical interaction between a user and onscreen activity of the video game. The adapter 4 of the first embodiment is used with a video game having an onscreen animated character 58 as shown in FIGS. 2b and 2c. The main body 32 of the adapter 4 corresponds to a head 60 of the character 58. The first and second arms 34, 35 of the adapter 4 correspond to left and right arms 62, 63 of the character 58, respectively. Pulling the handle 52 away from the main body 32 of the adapter 4 in the direction indicated by the arrow causes the character 58 to pull an onscreen object such as a bar 64. The arrow shows the direction of movement of the bar 64. Rotating the knob 46 in the direction indicated by the arrow causes the character 58 to spin an onscreen object such as a propeller 66. The arrow also indicates this direction of movement. Thus, input controls of the adapter 4 which activate the appropriate control buttons 22, 24 of the controller 2 include the knob 46, the handle 52, and the control pads 38. The directional movement of the onscreen character 58 is controlled by the directional control 12 and the push buttons 26 of the controller 2. The unique physical features of the adapter 4 allow a user to interactively manipulate onscreen activity by providing a realistic simulation of the character's 58 movement.

Figure 3:
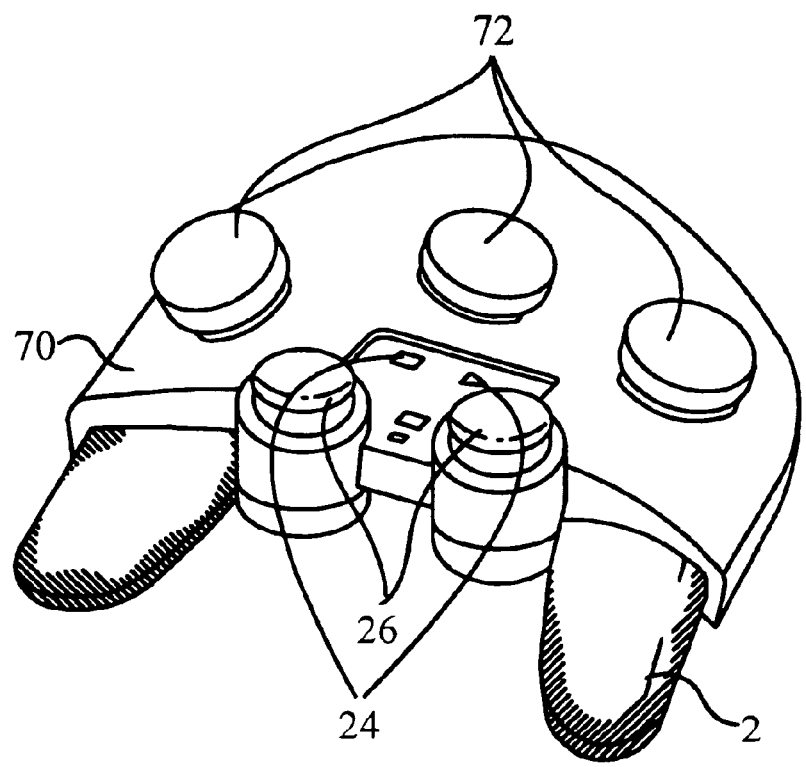
FIG. 3 illustrates a perspective view of a video game controller assembled with an interactive video game controller adapter in accordance with a second embodiment of the present invention.

An adapter 70 in accordance with a second embodiment of the present invention is shown in FIG. 3. The adapter 70 is used with software for a video game based on the popular television game show "Jeopardy!". In accordance with the rules of the game, players are given an answer and the first player to provide the correct question earns points. Three answer buttons 72, each corresponding to a player, are formed on a top face of the adapter 70. When an answer button 72 is depressed, one of the corresponding control buttons 14, 16, 22 on the controller 2 is activated. The software determines the first player to depress her answer button 72 and outputs this information to the screen. The first player to depress her answer button 72 uses the joysticks 26 to scroll through the answers. The player selects an answer using the fourth control buttons 24 and before attempting to provide the correct question. The adapter 70 of the second embodiment allows three players to participate in the game while using only one controller 2.

Figure 4:
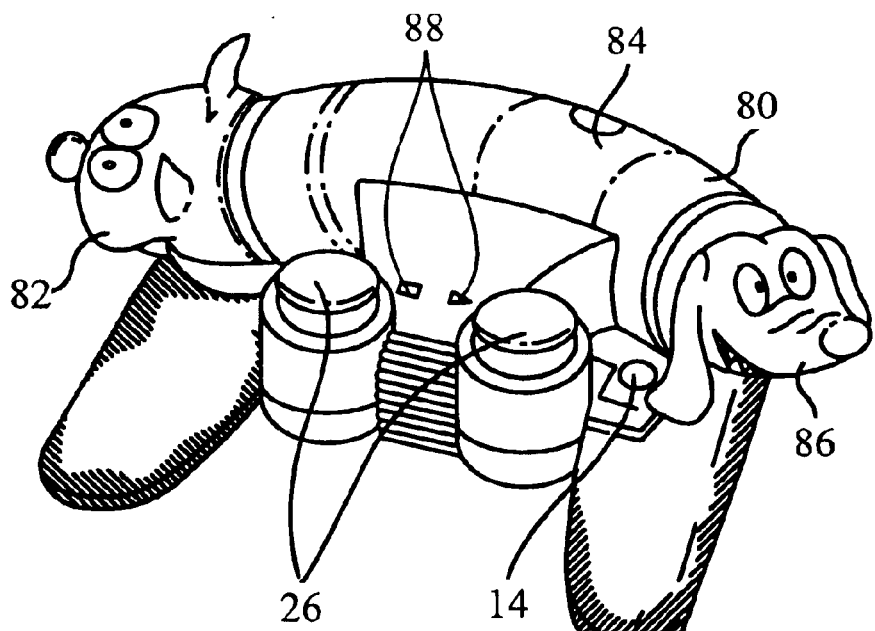
FIG. 4 illustrates a perspective view of a video game controller assembled with an interactive video game controller adapter in accordance with a third embodiment of the present invention.

In FIG. 4, an adapter 80 in accordance with a third embodiment of the present invention is shown. The adapter is used with a video game based on the Nickelodeon® television cartoon, Catdog. Catdog is an animated character having a cat's head 82 at one end of a body 84 and a dog's head 86 at an opposite end. A figure resembling Catdog is formed on a top face of the adapter 80. Each head 82, 86 is movable and can be pulled, twisted, or stretched. Control pads 88 aligned with the fourth control buttons 24 of the controller 2 are formed on the body 84. By manipulating the heads 82, 86 and the control pads 88 of the adapter 80 along with one of the first control buttons 14 and the push buttons 26 of the controller 2, a user becomes interactively involved with the onscreen activity of Catdog.

Figure 5:
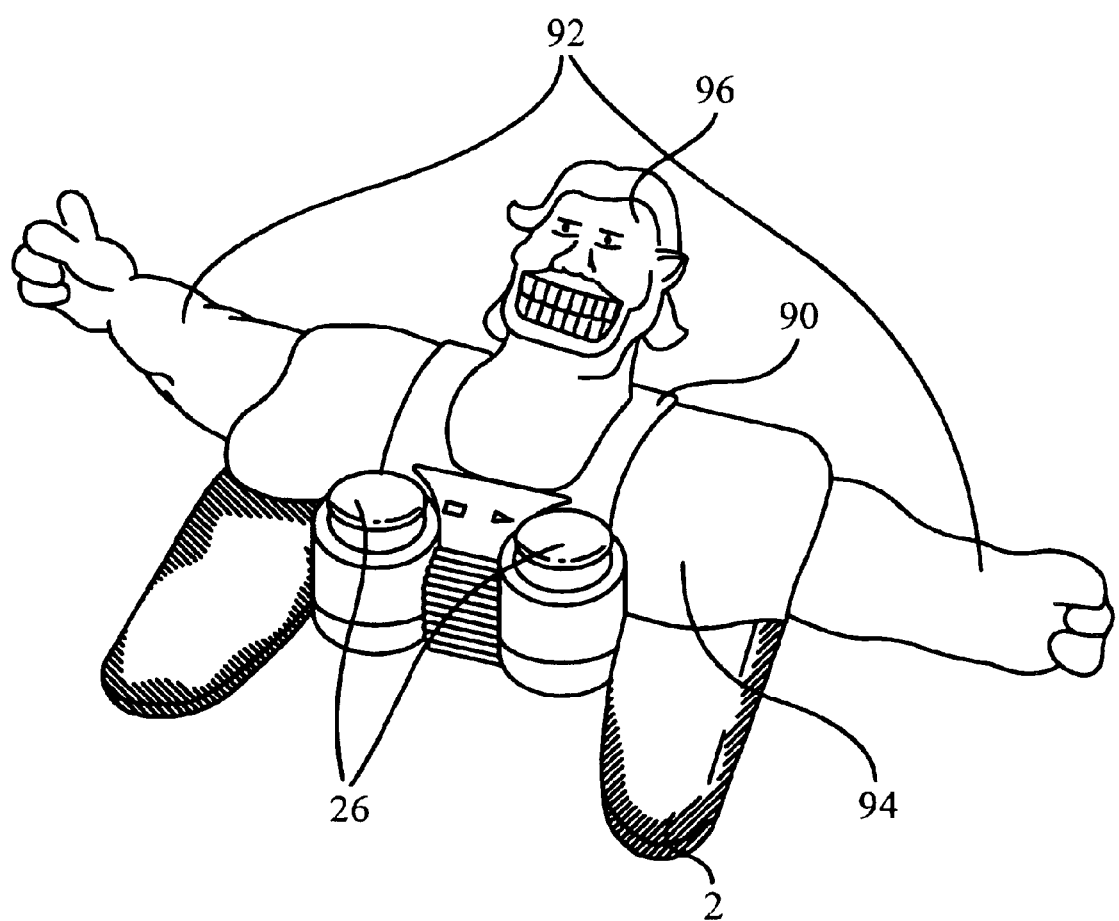
FIG. 5 illustrates a perspective view of a video game controller assembled with an interactive video game controller adapter in accordance with a fourth embodiment of the present invention.
Figure 6:
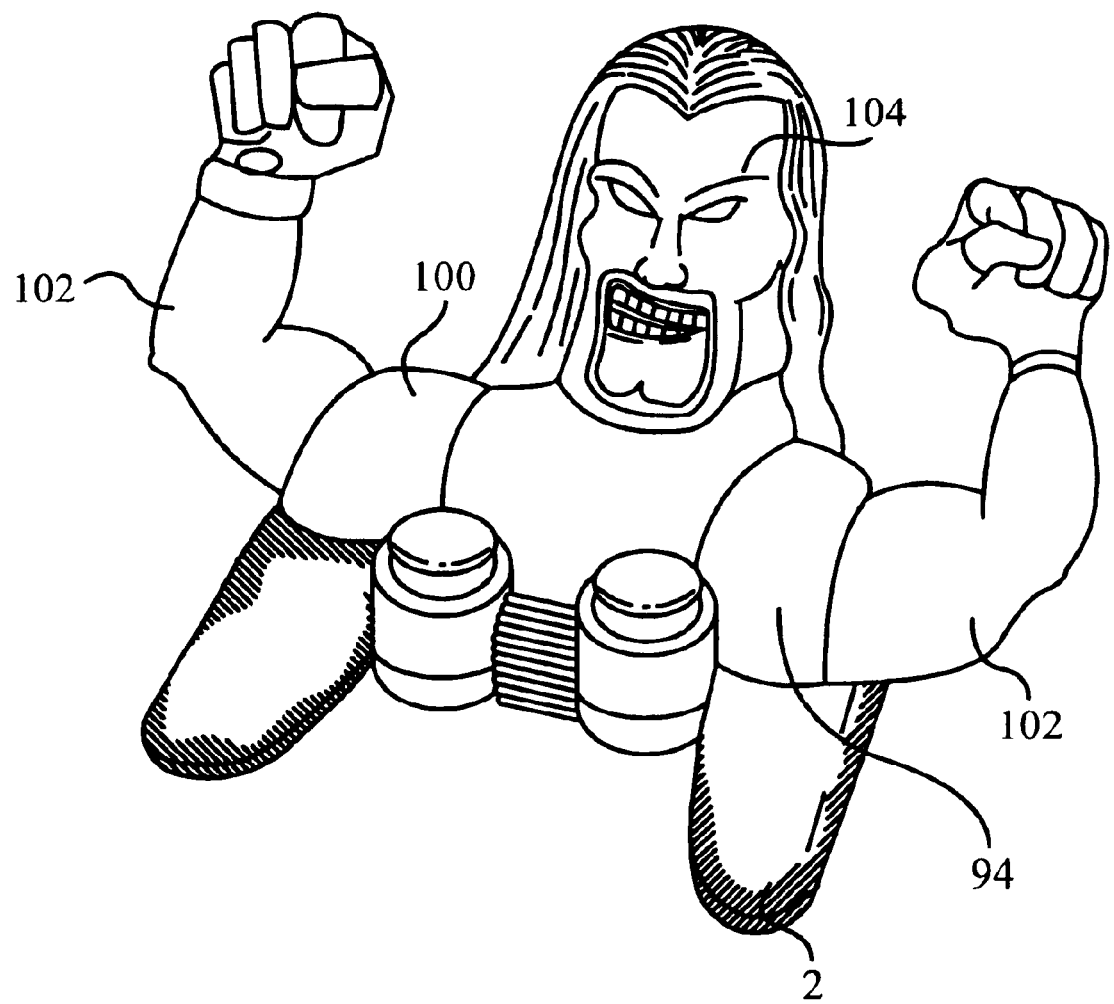
FIG. 6 illustrates a perspective view of a video game controller assembled with an interactive video game controller adapter in accordance with a fifth embodiment of the present invention.

An adapter 90 in accordance with a fourth embodiment of the present invention and used with a video game based on the Stretch Armstrong action figure is shown in FIG. 5. The adapter 90 comprises two retractable arms 92 outwardly extending from opposite ends of a main body 94 and a head 96 formed on a top portion of the main body 94. The head 96 and arms 92 correspond to a head and arms of an onscreen image of Stretch Armstrong. The head 96 and arms 92 are manipulated by a user to activate the appropriate control buttons 14, 16, 22, 24 of the controller 2 causing the onscreen image to move accordingly. The push buttons 26 of the controller 2 are activated to navigate the onscreen image of Stretch Armstrong through the course of the video game. A similar adapter 100 in accordance with a fifth embodiment of the present invention is shown in FIG. 6. The adapter 100 is used with a video game based on the WCW professional wrestling organization. Rotatable arms 102 and a retractable head 104 are manipulated to activate the appropriate control buttons 14, 16, 22, 24 of the controller 2 and dictate the movements of an onscreen image of a professional wrestler.

Figure 7:
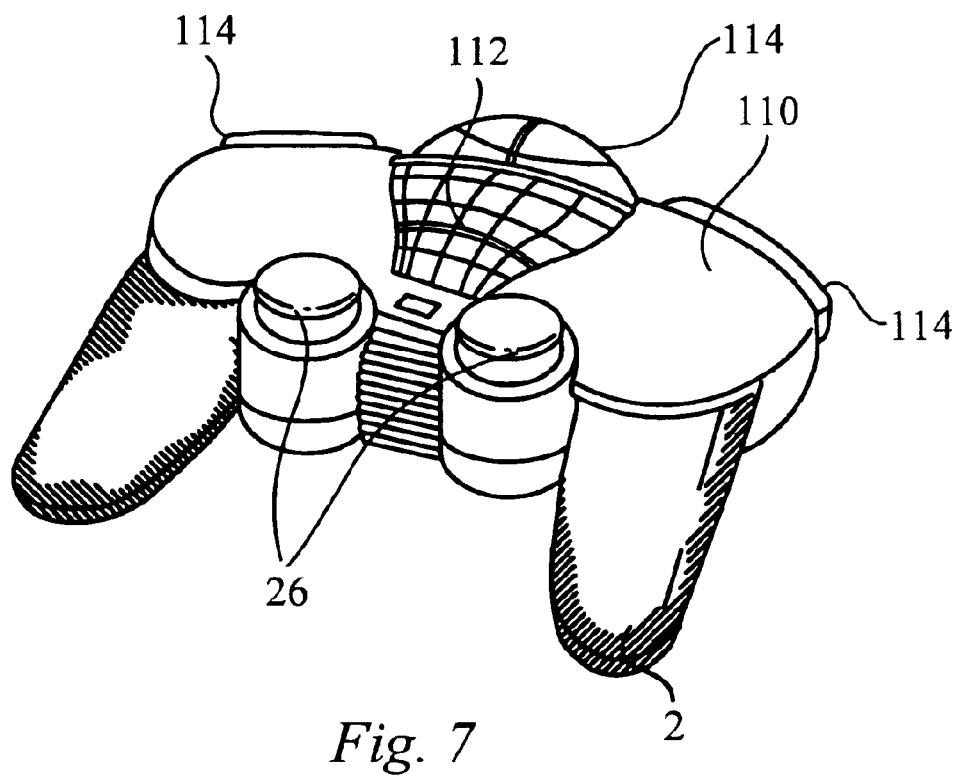
FIG. 7 illustrates a perspective view of a video game controller assembled with an interactive video game controller adapter in accordance with a sixth embodiment of the present invention.
Figure 8:
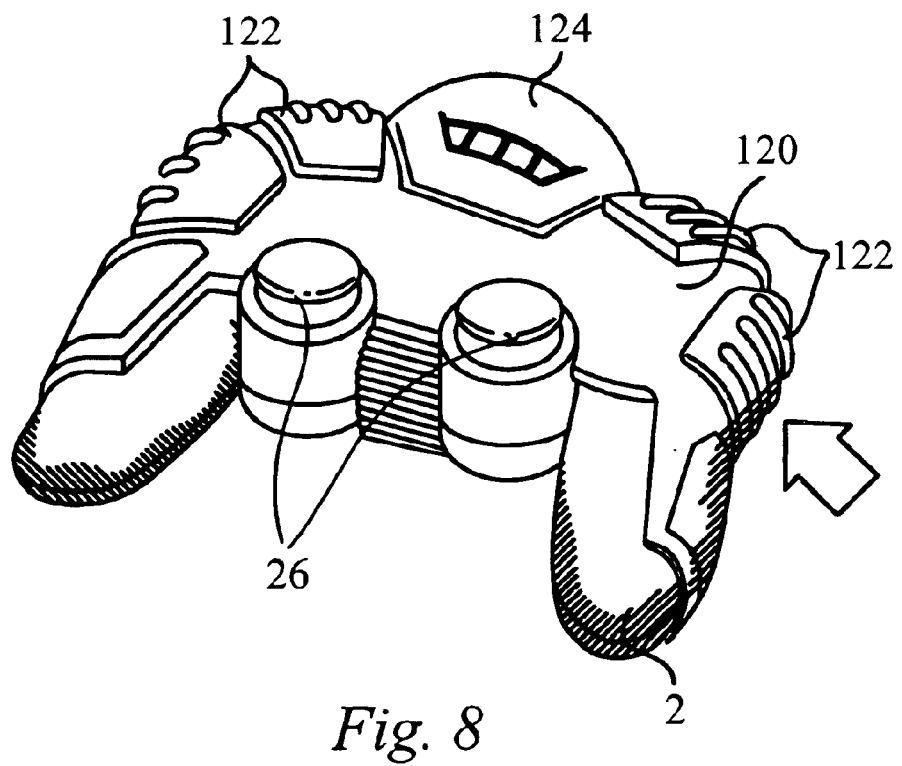
FIG. 8 illustrates a perspective view of a video game controller assembled with an interactive video game controller adapter in accordance with a seventh embodiment of the present invention.

FIG. 7 shows an adapter 110 in accordance with a sixth embodiment of the present invention to be used with a video basketball game. A raised portion 112 of a top face of the adapter 110 forms the shape of a basketball net. Control pads 114 project from a rear face of the adapter 110. The control pad 114 proximate the raised portion 112 is shaped like a basketball. The control pads 114 of the adapter 110 and the push buttons 26 of the controller 2 activate the control buttons 14, 16, 22, 24 of the controller 2 to regulate the movements of an onscreen basketball player. A similar adapter 120 in accordance with a seventh embodiment of the present invention is shown in FIG. 8. The adapter 120 is used with a video football game. The adapter 120 includes control pads 122 shaped like a football grip formed along rear and side faces thereof. A scoring button 124 is positioned on a central portion of the rear face of the adapter 120. The scoring button 124 resembles the touchdown area of a football field. A user induces the movements of an onscreen football player by manipulating the joysticks 28 of the controller 2 and by depressing the control pads 122 and the scoring button 124 of the adapter 120 to activate the corresponding control buttons 14, 16, 22, 24 of the controller 2.

Figure 9:
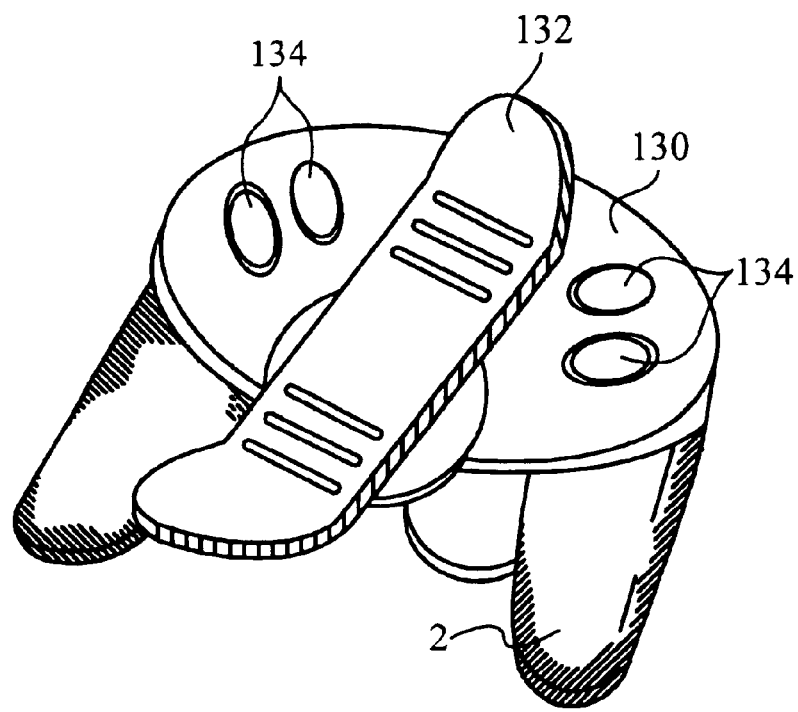
FIG. 9 illustrates a perspective view of a video game controller assembled with an interactive video game controller adapter in accordance with an eighth embodiment of the present invention.

An eighth embodiment of the adapter 130 of present invention as shown in FIG. 9 is used with a skateboarding video game. A finger-grippable model of a skateboard 132 is mounted on a top face of the adapter 130. A user depresses the skateboard 132 with her fingers to activate the directional control 12 and the push buttons 26 of the controller 2 to guide an onscreen image of a skateboarder along a desired course. Control pads 134 formed on the adapter 130 corresponding to the control buttons 14, 16, 22, 24 of the controller 2 allow a player to perform onscreen skateboard stunts.

Figure 10:
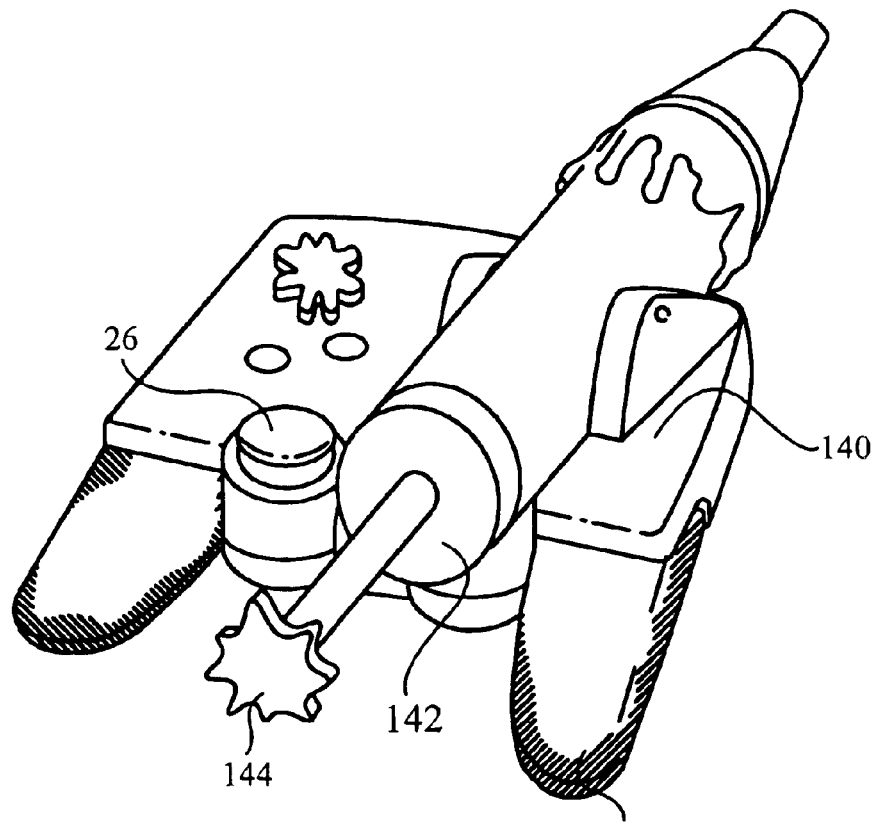
FIG. 10 illustrates a perspective view of a video game controller assembled with an interactive video game controller adapter in accordance with a ninth embodiment of the present invention.

An adapter 140 in accordance with a ninth embodiment of the present invention, as shown in FIG. 10, is used with a video game called "Splat Pumper". A pump gun 142 with a retractable handle 144 is mounted on a top face of the adapter 140 and resembles an onscreen splat pumper. Sliding the handle 144 away from or toward the pump gun 142 activates the appropriate control buttons 14, 16, 22, 24 of the controller 2 to load or project a liquid substance depicted onscreen. The greater the pressure applied to the pump gun 142 of the adapter 140 the larger the resulting discharge from the onscreen pump. The "splat" direction is selected by manipulating one of the push buttons 26 of the controller 2.

Figure 11:
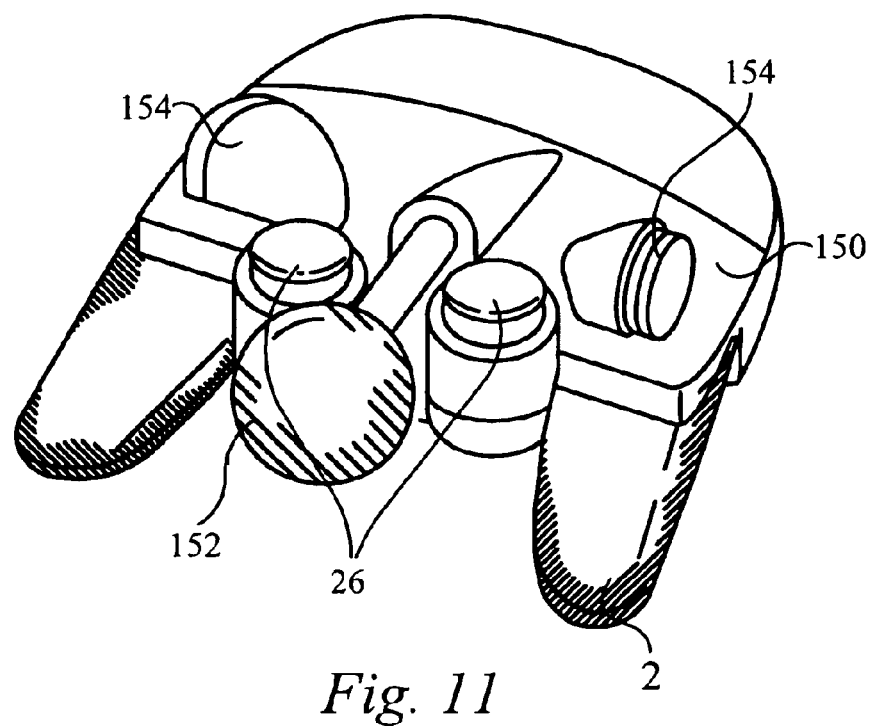
FIG. 11 illustrates a perspective view of a video game controller assembled with an interactive video game controller adapter in accordance with a tenth embodiment of the present invention.

FIG. 11 shows an adapter 150 in accordance with a tenth embodiment of the present invention for use with a video pinball game. A plunger 152 is pulled to enter an onscreen ball into play. A pair of flipper buttons 154 activate the corresponding control buttons 14, 16, 22, 24 of the controller 2 to drive onscreen flippers. The fifth control buttons 26 of the controller 2 activate tilt action. The configuration of the adapter 150 resembles the controls of a conventional arcade pinball machine including the ability to tilt or slam.

Figure 12:
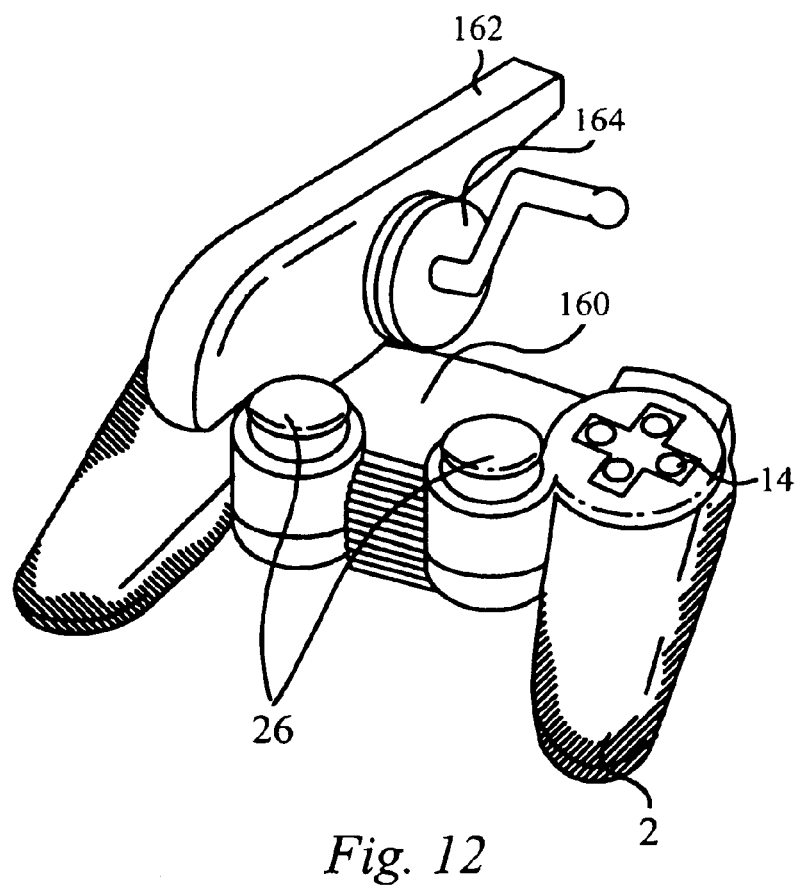
FIG. 12 illustrates a perspective view of a video game controller assembled with an interactive video game controller adapter in accordance with an eleventh embodiment of the present invention.

An adapter 160 in accordance with an eleventh embodiment of the present invention is a shown in FIG. 12. The adapter 160 is used with a fishing video game. A rod 162 and a reel 164 mounted on a top face of the adapter 160 activate the appropriate control buttons 16, 22, 24 of the controller 2 to cast a line in a desired onscreen direction and to reel the line in when necessary. The first control buttons 14 and the push buttons 26 of the controller 2 allow a user to position an onscreen boat at a desired location in accordance with the rules of the video game. Such a configuration of the adapter 160 facilitates fishing simulation by modeling the physical action of reeling in a fish or some other object attached to the line.

Figure 13:
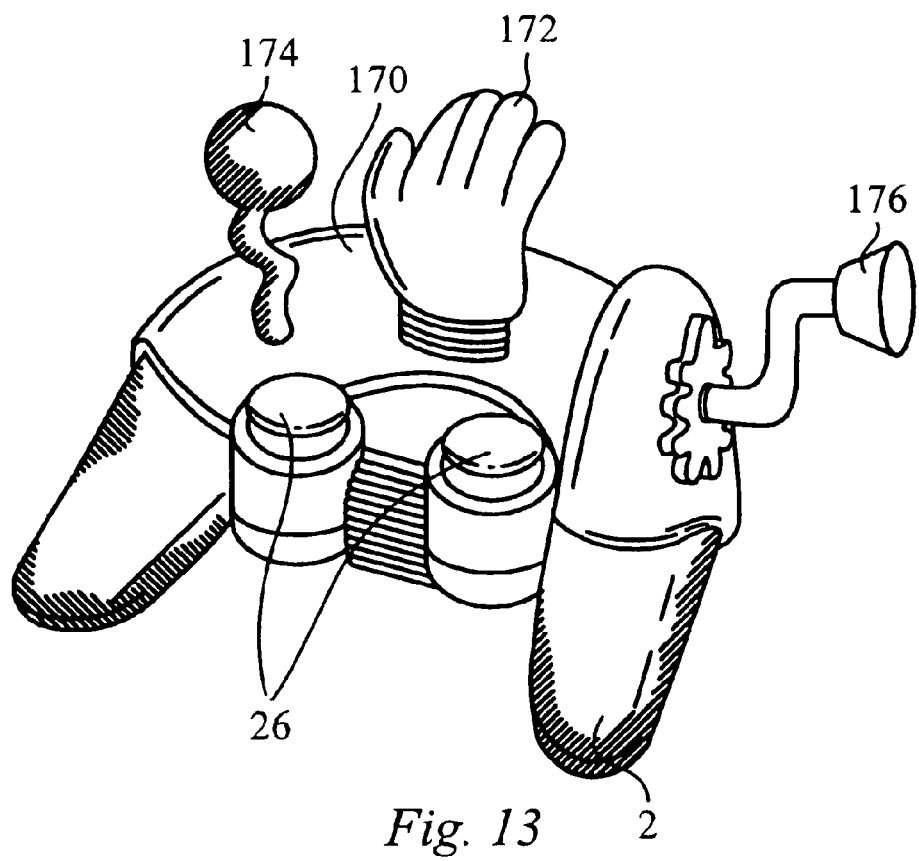
FIG. 13 illustrates a perspective view of a video game controller assembled with an interactive video game controller adapter in accordance with a twelfth embodiment of the present invention.

FIG. 13 shows an adapter 170 in accordance with a twelfth embodiment of the present invention for use with a Nickelodeon® Toon World video game. Manipulation of a flexible hand 172 projecting from a top face of the adapter 170 allows a player to throw onscreen slime by activating the corresponding control buttons 14, 16, 22 of the controller 2. A toon lever 174 for selecting different options associated with the game extends from the top face of the adapter 170 proximate an end thereof A crank 176 mounted on the top face of the adapter 170 at an opposite end thereof allows a user to capture onscreen objects. The push buttons 26 of the controller 2 allow a user to navigate an onscreen character along a desired course.

Figure 14:
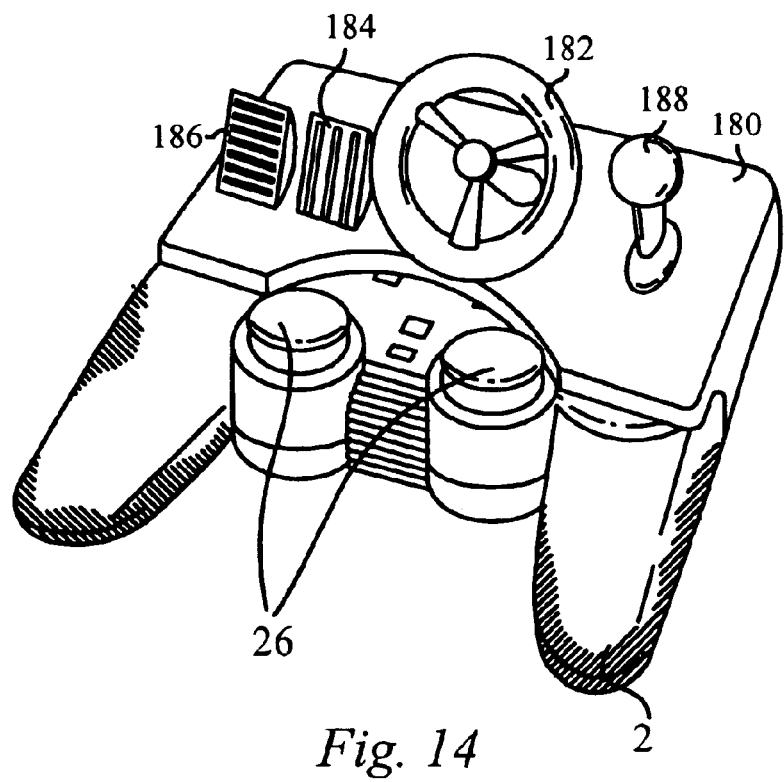
FIG. 14 illustrates a perspective view of a video game controller assembled with an interactive video game controller adapter in accordance with a thirteenth embodiment of the present invention.

An adapter 180 in accordance with a thirteenth embodiment of the present invention, as shown in FIG. 14, is used with an automobile racing video game. A steering wheel 182 activates the corresponding control buttons 14, 16, 22 of the controller 2 to guide an onscreen automobile along a race course. A gas pedal 184, a brake pedal 186, and a gear shift 188 are matched with other corresponding control buttons 14, 16, 22 of the controller 2 to simulate automobile racing.

Figure 15:
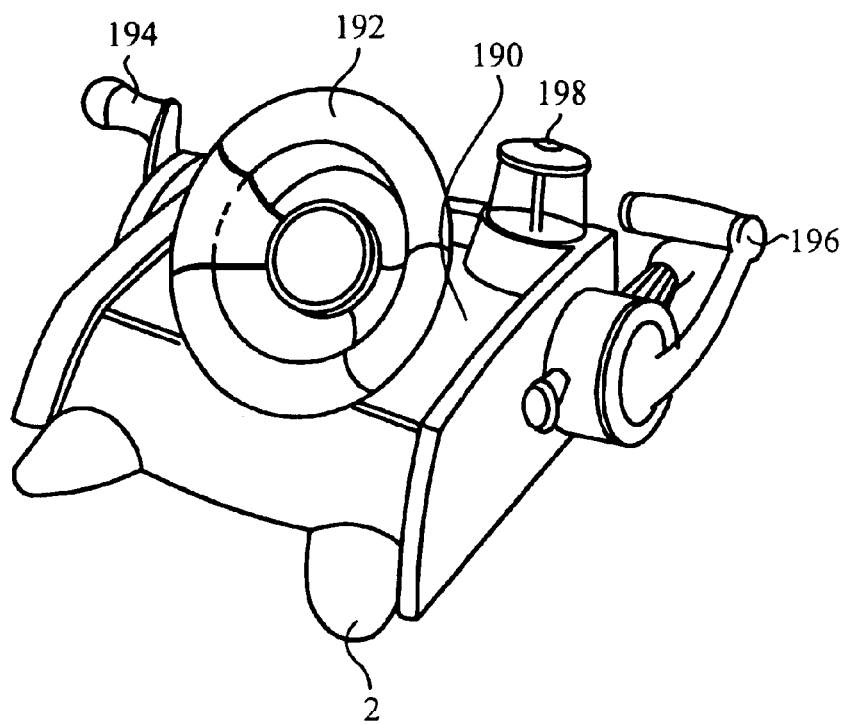
FIG. 15 illustrates a perspective view of a video game controller assembled with an interactive video game controller adapter in accordance with a fourteenth embodiment of the present invention.

An adapter 190 in accordance with a fourteenth embodiment of the present invention is used with a fire rescue video game. The adapter 190 is shown in FIG. 15. A steering wheel 192 mounted on a top face of the adapter 190 activates the corresponding control buttons 14, 16, 22, 24 and the joysticks 28 of the controller 2 to guide an onscreen fire truck along its course. A winch 194 mounted on a side of the adapter 190 allows a user to control the height of onscreen ladders. A water lever 196 mounted on an opposite side of the adapter 190 provides the user with control over the flow of water from onscreen hoses. A siren 198 is provided on the top face of the adapter 190 to further enhance video game interaction.

Figure 16:
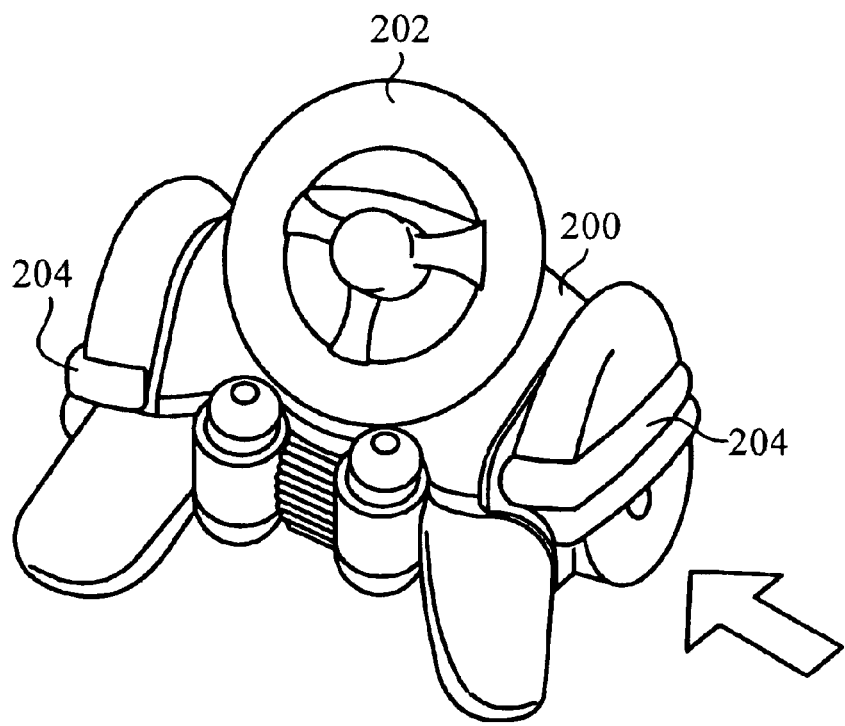
FIG. 16 illustrates a perspective view of a video game controller assembled with an interactive video game controller adapter in accordance with a fifteenth embodiment of the present invention.

Referring to FIG. 16, an adapter 200 in accordance with a fifteenth embodiment of the present invention is used with a bumper car video game. A steering wheel 202 mounted on a top surface of the adapter 200 activates the appropriate control buttons 14, 16, 22, 24 of the controller 2 to guide an onscreen bumper car along its course. A pair of bumper pads 204 extending from opposite ends of the adapter 200 allow a user to bump an opposing player when the onscreen cars of the two players come into contact.

Figure 17:
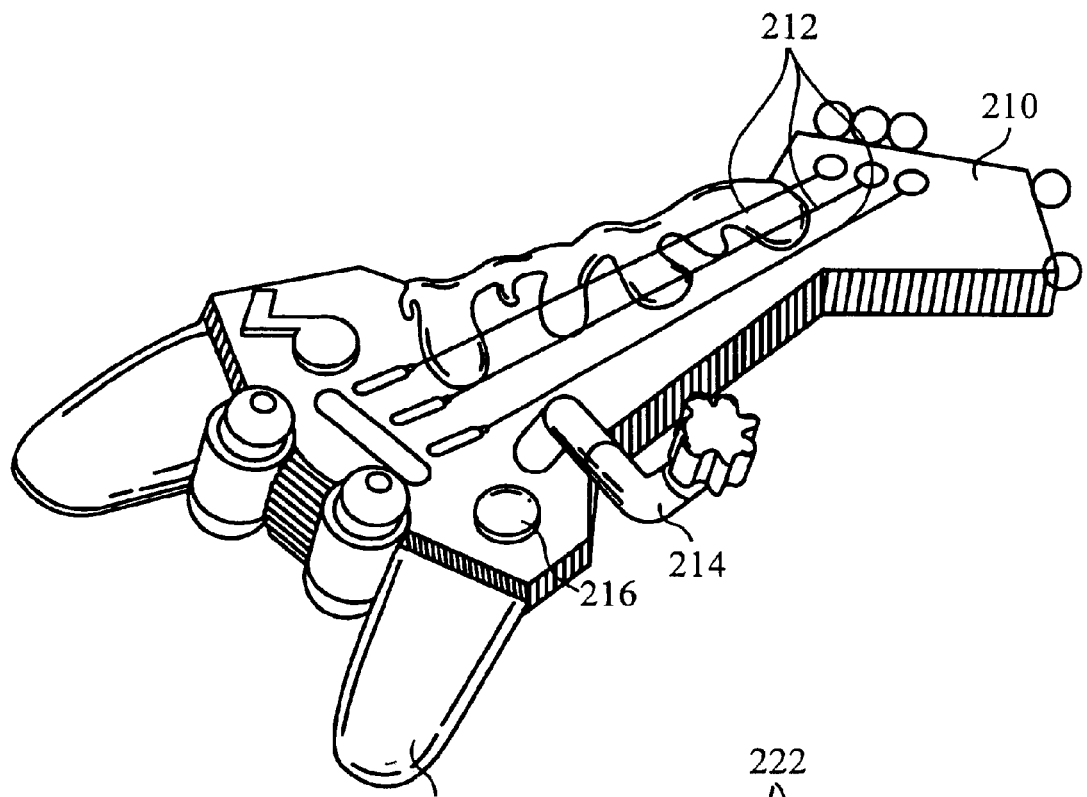
FIG. 17 illustrates a perspective view of a video game controller assembled with an interactive video game controller adapter in accordance with a sixteenth embodiment of the present invention.

A guitar-shaped adapter 210 in accordance with a sixteenth embodiment of the present invention is shown in FIG. 17. The adapter 210 is used with software for activating a video guitar. A user can create music by plucking strings 212 of the adapter 210 which drive the corresponding control buttons 14, 16, 22, 24 of the controller 2. Music is output from a speaker of the video game system. A whammy bar 214 and a tone control knob 216 formed on a top face of the adapter 210 allow a user to further manipulate the sound of the video guitar much like a real electric guitar.

Figure 18:
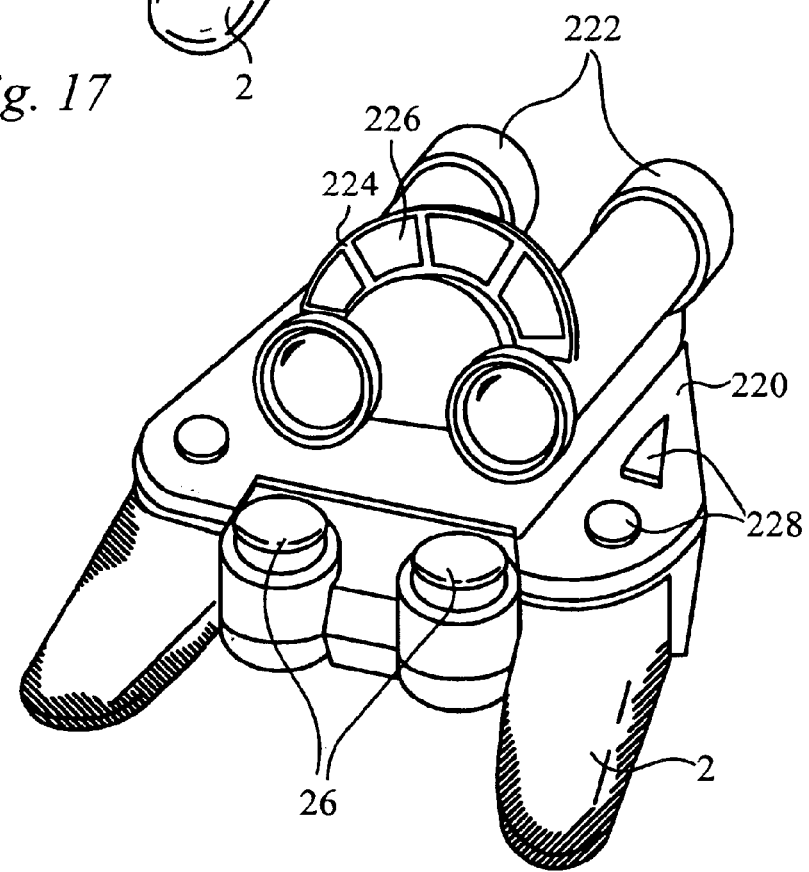
FIG. 18 illustrates a perspective view of a video game controller assembled with an interactive video game controller adapter in accordance with a seventeenth embodiment of the present invention.

FIG. 18 shows an adapter 220 in accordance with a seventeenth embodiment of the present invention for use with a night vision video game. By looking through a pair of lenses 222 mounted on a top face of the adapter 220 a user can detect onscreen objects obscured by darkness. A disc 224 with different colored windows 226 is positioned within the lenses 222 and allows a user to change the color of the line of vision thereby revealing secret messages and other players on the screen. The push buttons 26 of the controller 2 allow a user to navigate through different screens. Control pads 228 formed on the top face of the adapter 220 correspond to the appropriate control buttons 14, 16, 22 of the controller 2.

The above description of the interactive video game controller adapter in accordance with the present invention discloses a device for enhancing a video game controller to accommodate related video game software with specialized controls. Such a configuration facilitates simulation of the real-life activity emulated by the video game. The interactive video game controller adapter of the present invention allows a single video game controller to be transformed to accommodate the related video game software which heretofore has never been accomplished. Thus, the interactive video game controller adapter in accordance with the present invention is novel and unobvious and should be granted a patent on the merits.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made to the embodiments chosen for illustration without departing from the spirit and scope of the invention. Specifically, it will be apparent to one of ordinary skill in the art that the adapter of the present invention could be implemented in several different ways and the architecture, system and method disclosed above are only illustrative of preferred embodiments of the invention.

We claim:

1. A video game system comprising:
   a) an output screen;
   b) a hand-held video game controller having control buttons for inputting commands to manipulate images on the output screen through a cord;
   c) video game software interfacing between the hand-held video game controller and the output screen;
   d) an interactive video game controller adapter detachably engaged with the hand-held video game controller and shaped to simulate the real-life activity emulated by the video game, wherein the control buttons of the hand-held video game controller are activated when the corresponding input controls of the adapter are activated and
   e) a main body and at least two arms extending from the main body, a lip formed on a front portion of the main body for engaging with the hand-held controller, a cutout defined in each arm for receiving corresponding engaging portions of the hand-held controller, and a receiving space formed in the main body for receiving a portion of the hand-held controller.

2. The video game system as claimed in claim 1, wherein the adapter has input controls shaped to simulate the real-life activity emulated by the video game.

3. The video game system as claimed in claim 1, wherein a different adapter is provided for each different video game of the video game system.

4. A video game input device comprising:
   a) a hand-held video game controller having control buttons for inputting commands to manipulate video game images on an output screen of a video game system through a power cord; and
   b) an interactive video game controller adapter detachably engaged with the hand-held video game controller and shaped to simulate the real-life activity emulated by the video game, wherein the interactive video game controller adapter comprises:
   a main body and at least two arms extending from the main body, a lip formed on a front portion of the main body for engaging with the hand-held controller, a cutout defined in each arm for receiving corresponding engaging portions of the hand-held controller, and a receiving space formed in the main body for receiving a portion of the hand-held controller.

5. The video game input device as claimed in claim 4, wherein the adapter has input controls shaped to simulate the real-life activity emulated by the video game.

6. The video game input device as claimed in claim 4, wherein a different adapter is provided for each different video game of the video game system.

7. The video game input device as claimed in claim 4, wherein the hand-held video game controller is used with a Sony Playstation™ video game system.

8. The video game input device as claimed in claim 4, wherein the hand-held controller comprises:
   a) a main body;
   b) a pair of circular base plates formed on a top face of the main body and spaced from each other a predetermined distance; and
   c) two projections formed on a rear face of the main body.

9. The video game input device as claimed in claim 8, wherein the control buttons of the hand-held controller are formed on the base plates, the projections, and the top face of the main body of the controller.

10. The video game input device as claimed in claim 8, wherein the hand-held controller comprises a pair of push buttons formed on the top face of the main body, a pair of handgrips formed on opposite ends of the main body, and a power cord extending from the rear face of the main body for electrically connecting the hand-held controller to the video game system.

11. The video game input device as claimed in claim 10, wherein the adapter comprises a retractable handle outwardly extending from one of the two arms, a rotatable knob outwardly extending from the other of the two arms, a rod inwardly extending from each of the handle and the knob into the receiving space, and an end portion perpendicularly extending from each rod, each end portion being positioned proximate the control buttons formed on the corresponding projection of the hand-held controller whereby manipulation of the knob and handle causes the end portions to activate the corresponding control buttons.

12. The video game input device as claimed in claim 11, wherein the adapter is used with a video game having an animated onscreen character, the main body of the adapter corresponding to a head of the character, the arms of the adapter corresponding to the arms of the character whereby pulling the handle away from the main body of the adapter causes the character to pull an onscreen object and rotating the knob causes the character to spin an onscreen object.

13. An interactive video game controller adapter having a lip for detachably engaging with a hand-held video game controller, the interactive video game controller adapter comprising a body shaped to represent the unique characteristics of a video game and having a receiving space for receiving the hand-held video game controller, the interactive video game controller adapter further comprising at least two arms extending from the body to manipulate and activate control buttons on the hand-held video game controller and having a cutout defined in each arm for receiving the hand-held video game controller and thereby manipulate images of a video game on a remote screen coupled to the hand-held video game controller.

14. The interactive video game controller adapter as claimed in claim 13, wherein the adapter the input controls are shaped to simulate the real-life activity emulated by the video game.

15. The interactive video game controller adapter as claimed in claim 13 further comprising a lip formed on a front portion of the body for engaging with the hand-held controller, and a cutout defined in each arm for receiving corresponding engaging portions of the hand-held controller.

16. The interactive video game controller adapter as claimed in claim 15 further comprising a retractable handle outwardly extending from one of the two arms, a rotatable knob outwardly extending from the other of the two arms, a rod inwardly extending from each of the handle and the knob into the receiving space, and an end portion perpendicularly extending from each rod, each end portion being positioned proximate the corresponding control buttons of the hand-held controller whereby manipulation of the knob and handle causes the end portions to activate the corresponding control buttons.

17. The interactive video game controller adapter as claimed in claim 16, wherein the adapter is used with a video game having an animated onscreen character, the main body of the adapter corresponding to a head of the character, the arms of the adapter corresponding to the arms of the character whereby pulling the handle away from the main body of the adapter causes the character to pull an onscreen object and rotating the knob causes the character to spin an onscreen object.

18. An adapter for detachably coupling to a portion of a hand-held video game controller, the adapter having a body having a lip and section being shaped to represent the unique characteristics of a video game the adapter having two arms each having a cut-out portion or receiving a portion of the hand-held video game controller, the adapter further comprising a plurality of input controls configured to manipulate and activate a plurality of corresponding input controls of the hand-held video game controller and thereby manipulate images of a video game on a remote screen coupled to the hand-held video game controller.

* * * * *

UNITED STATES PATENT AND TRADEMARK OFFICE
CERTIFICATE OF CORRECTION

PATENT NO. : 6,811,491 B1
DATED : November 2, 2004
INVENTOR(S) : Levenberg et al.

It is certified that error appears in the above-identified patent and that said Letters Patent is hereby corrected as shown below:

Column 9,
Lines 38-40, delete "and having a cutout defined in each arm for receiving the hand-held video game controller and thereby manipulate images of a video game on a remote screen coupled to the hand-held video game controller." add -- and thereby manipulate images of a video game on a remote screen coupled to the hand-held video game controller and having a cutout defined in each arm for receiving the hand-held video game controller. --.

Signed and Sealed this

Twenty-third Day of August, 2005

JON W. DUDAS
*Director of the United States Patent and Trademark Office*